United States Patent
Wang

(10) Patent No.: US 11,706,484 B2
(45) Date of Patent: Jul. 18, 2023

(54) VIDEO PROCESSING METHOD, ELECTRONIC DEVICE AND COMPUTER-READABLE MEDIUM

(71) Applicant: GUANGDONG OPPO MOBILE TELECOMMUNICATIONS CORP., LTD., Guangdong (CN)

(72) Inventor: Lizhong Wang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 17/326,057

(22) Filed: May 20, 2021

(65) Prior Publication Data

US 2021/0274251 A1 Sep. 2, 2021

Related U.S. Application Data

(63) Continuation of application No. PCT/CN2019/109112, filed on Sep. 29, 2019.

(30) Foreign Application Priority Data

Nov. 27, 2018 (CN) .......................... 201811428012.9

(51) Int. Cl.
*H04N 21/4402* (2011.01)
*H04N 5/783* (2006.01)
(Continued)

(52) U.S. Cl.
CPC ..... *H04N 21/440281* (2013.01); *H04N 5/783* (2013.01); *H04N 21/44008* (2013.01); *H04N 21/44029* (2013.01); *H04N 21/4621* (2013.01)

(58) Field of Classification Search
CPC .......... H04N 21/440281; H04N 5/783; H04N 21/44008; H04N 21/44029; H04N 21/4621
See application file for complete search history.

(56) References Cited

U.S. PATENT DOCUMENTS

| 6,469,744 | B1 | 10/2002 | Pearlstein |
| 10,284,812 | B1* | 5/2019 | Van Os .................. H04N 21/47 |

(Continued)

FOREIGN PATENT DOCUMENTS

| CN | 101072339 A | 11/2007 |
| CN | 102033729 A | 4/2011 |

(Continued)

OTHER PUBLICATIONS

Extended European Search Report for EP Application 19889803.3 dated Sep. 22, 2021. (13 pages).

(Continued)

*Primary Examiner* — Sunghyoun Park
(74) *Attorney, Agent, or Firm* — Young Basile Hanlon & MacFarlane, P.C.

(57) ABSTRACT

A video-processing method includes: obtaining a video frame rate of received video data; determining whether the video frame rate is less than the refreshing frame rate of a screen; and if yes, modifying at least one of the video frame rate of the video data or the refreshing frequency, so that the video frame rate of the video data is greater than or equal to the refreshing frame rate after modification. According to the present application, the effect that the video frame rate of a video file is greater than or equal to the refreshing frequency of the screen can be guaranteed, thus images corresponding to the video file can be displayed when the screen is refreshed, thereby avoiding standstill phenomena of video playback.

16 Claims, 7 Drawing Sheets

(51) Int. Cl.
*H04N 21/44* (2011.01)
*H04N 21/462* (2011.01)

(56) References Cited

U.S. PATENT DOCUMENTS

| | | | | |
|---|---|---|---|---|
| 2002/0109819 | A1* | 8/2002 | Tuval | G09G 3/003 351/206 |
| 2006/0161964 | A1* | 7/2006 | Chung | H04R 3/14 348/E5.002 |
| 2008/0284763 | A1* | 11/2008 | Someya | G09G 3/001 345/204 |
| 2010/0260468 | A1 | 10/2010 | Khatib et al. | |
| 2011/0097059 | A1* | 4/2011 | Sekiguchi | H04N 5/783 386/343 |
| 2013/0141642 | A1* | 6/2013 | Wu | G09G 5/363 348/E7.001 |
| 2015/0382056 | A1* | 12/2015 | Burton | H04N 21/4622 725/25 |
| 2016/0142769 | A1 | 5/2016 | Spracklen et al. | |
| 2016/0291917 | A1 | 10/2016 | Hu et al. | |
| 2016/0353054 | A1* | 12/2016 | Gilmutdinov | H04N 7/0127 |
| 2017/0124965 | A1* | 5/2017 | Verbeure | G09G 3/3611 |
| 2018/0261174 | A1 | 9/2018 | Peng et al. | |

FOREIGN PATENT DOCUMENTS

| | | |
|---|---|---|
| CN | 102547248 A | 7/2012 |
| CN | 103188548 A | 7/2013 |
| CN | 103347144 A | 10/2013 |
| CN | 104375789 A | 2/2015 |
| CN | 104639978 A | 5/2015 |
| CN | 104754409 A | 7/2015 |
| CN | 104808984 A | 7/2015 |
| CN | 104951266 A | 9/2015 |
| CN | 105007443 A | 10/2015 |
| CN | 105828183 A | 8/2016 |
| CN | 106658037 A | 5/2017 |
| CN | 106936995 A | 7/2017 |
| CN | 108600668 A | 9/2018 |
| CN | 109640168 A | 4/2019 |
| EP | 2824851 A1 | 1/2015 |

OTHER PUBLICATIONS

Chinese First office action with English Translation of Chinese Application No. 201811428012.9 dated Dec. 27, 2019 (17 pages).
Notification to Grant Patent Right for Invention with English Translation of Chinese Application No. 201811428012.9, dated May 11, 2020. (7 pages).
International search report with English Translation of PCT/CN2019/ 109112 dated Dec. 27, 2019. (16 pages).
Communication pursuant to Article 94(3) EPC for EP Application 19889803.3 dated Aug. 9, 2022. (12 pages).
Rejhon Mark,"Are There Advantages to Frame Rates Higher Than the Refresh Rate? ", URL:https://blurbusters.com/aq/benefits-of-frame-rate-above-refresh-rate/, Blur Busters, XP055948102, Aug. 11, 2017. (5 pages).

* cited by examiner

VIDEO PROCESSING METHOD, ELECTRONIC DEVICE AND COMPUTER-READABLE MEDIUM

CROSS-REFERENCE TO RELATED APPLICATION(S)

The present application is a continuation-application of International (PCT) Patent Application No. PCT/CN2019/109112 filed on Sep. 29, 2019, which claims priority to Chinese Patent Application No. CN201811428012.9 filed on Nov. 27, 2018, the contents of both of which are hereby incorporated by reference in their entireties.

TECHNICAL FIELD

The present disclosure relates to the field of video processing, and in particular to a video-processing method, an electronic device, and a computer-readable non-transitory medium.

BACKGROUND

With the development of electronic technology and information technology, an increasing number of devices can play videos. While playing the videos, the device needs to perform operations such as decoding, rendering, and synthesis, on the videos, and then display the videos on a display screen.

SUMMARY

The present disclosure provides a video-processing method, an apparatus, an electronic device, and a computer-readable medium to solve the above technical problem.

According to a first aspect, embodiments of the present disclosure provide a video-processing method for an electronic device, and the electronic device may include a screen. The method may include: acquiring a video frame rate of video data; and modifying at least one of the video frame rate of the video data and the refreshing rate of the screen in response to the video frame rate being less than a refreshing rate of the screen, the video frame rate of the video being greater than or equal to the refreshing rate.

According to a second aspect, embodiments of the present disclosure provide an electronic device, including: a screen; at least one processor; and at least one non-transitory memory, which includes program code. The at least one non-transitory memory and the program code are configured to, with the at least one processor, cause the electronic device to perform the above-mentioned method.

According to a third aspect, embodiments of the present disclosure provide a computer-readable non-transitory medium, having a computer code stored therein. The computer code is capable of being invoked by a processor to execute the above-mentioned method.

BRIEF DESCRIPTION OF DRAWINGS

In order to illustrate technical solutions of embodiments of the present disclosure clearly, accompanying drawings for describing the embodiments will be introduced in brief. Obviously, the drawings in the following description are only some embodiments of the present application. For those skilled in the art, other drawings can be obtained based on the provided drawings without any creative work.

DETAILED DESCRIPTION

Figure 1:
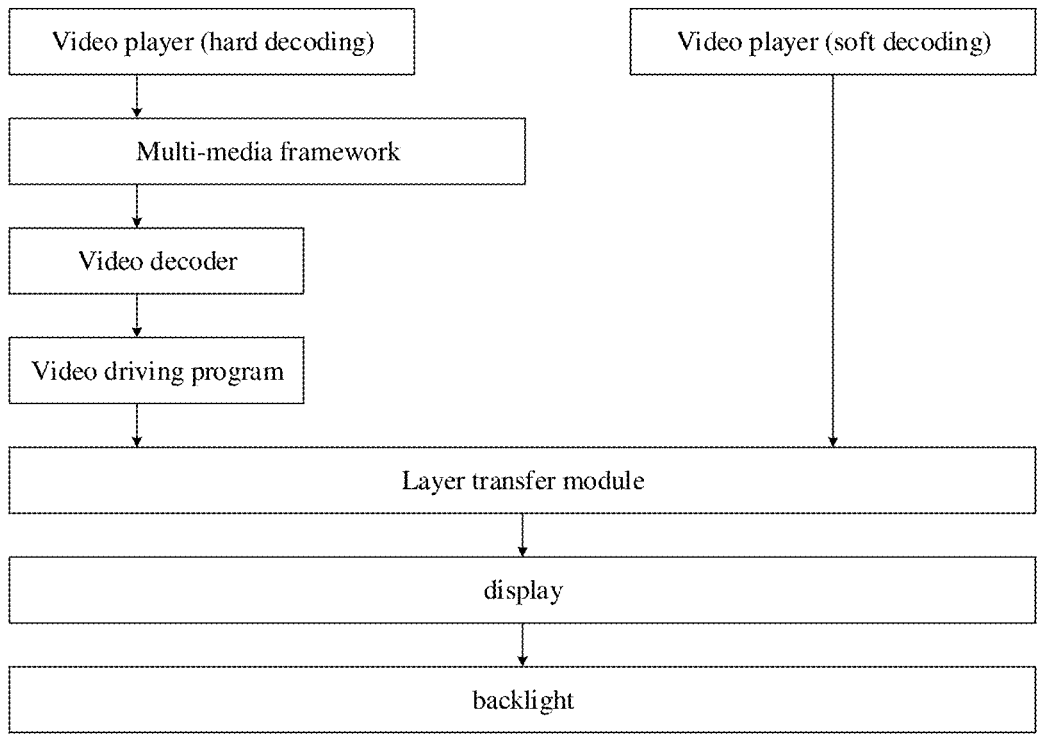
FIG. 1 is a diagram of a framework of playing a video according to an embodiment of the present disclosure.

In order to allow any ordinary skilled person in the art to understand the technical solution of the present disclosure, technical solutions of the present disclosure may be clearly and comprehensively described by referring to the accompanying drawings.

According to a first aspect, embodiments of the present disclosure provide a video-processing method for an electronic device, and the electronic device may include a screen. The method may include: acquiring a video frame rate of video data; and modifying at least one of the video frame rate of the video data and the refreshing rate of the screen in response to the video frame rate being less than a refreshing rate of the screen, the video frame rate of the video being greater than or equal to the refreshing rate.

In some embodiments, the number of video data is more than one, and the number of video frame rates is more than one. The modifying at least one of the video frame rate of the video data and the refreshing rate of the screen, in response to the video frame rate being less than a refreshing rate of the screen, the video frame rate of the video being greater than or equal to the refreshing rate, includes: taking video data corresponding to the video frame rate less than the refreshing rate of the screen as a first video data, in response to the video frame rate less than the refreshing rate of the screen being in the more than one video frame rates; and taking a lowest video frame rate of the first video data as a target frame rate; and modifying the refreshing rate of the screen based on the target frame rate, the video frame rate of the first video data being greater than or equal to the modified refreshing rate of the screen.

In some embodiments, the modifying the refreshing rate of the screen based on the target frame rate, includes: modifying the refreshing rate of the screen to be the target frame rate.

In some embodiments, the method further includes: after the modifying the refreshing rate of the screen to be the target frame rate, in the more than one video frame rates, modifying any video frame rate greater than the target frame rate to be the target frame rate.

In some embodiments, the modifying any video frame rates greater than the target frame rate to be the target frame rate, includes: taking video data corresponding to the video frame rate greater than the target frame rate as a second video data; and performing a re-sampling process on the second video data, and reducing a video frame rate of the second video data to be the target frame rate.

In some embodiments, the modifying the refreshing rate of the screen based on the target frame rate, includes modifying the refreshing rate of the screen to be less than the target frame rate.

In some embodiments, before the taking video data corresponding to the video frame rate less than the refreshing rate of the screen as a first video data, in response to the video frame rate less than the refreshing rate of the screen being in the more than one video frame rates, the method further includes: placing the more than one video frame rates in an order from a lowest video frame rate to a highest video frame rate, and obtaining a video frame rate sequence; and comparing each of the more than one video frame rates in the video frame rate sequence with the refreshing rate of the screen one by one from the lowest video frame rate, and determining the video frame rate less than the refreshing rate of the screen in the more than one video frame rates.

In some embodiments, the comparing each of the one or more video frame rates in the video frame rate sequence with the refreshing rate of the screen one by one, starting from the lowest video frame rate, and determining whether the video frame rate less than the refreshing rate of the screen is present in the one or more video frame rates, includes: determining the lowest video frame rate in the video frame rate sequence; comparing the lowest video frame rate with the refreshing rate of the screen; and determining the video frame rate less than the refreshing rate of the screen in the more than one video frame rates, in response to the lowest video frame rate being less than the refreshing rate of the screen.

In some embodiments, before the taking video data corresponding to the video frame rate less than the refreshing rate of the screen as a first video data, in response to the video frame rate less than the refreshing rate of the screen being in the more than one video frame rates, the method further includes: comparing each of the more than one video frame rates with the refreshing rate of the screen, and determining the video frame rate less than the refreshing rate of the screen in the more than one video frame rates.

In some embodiments, the modifying at least one of the video frame rate of the video data and the refreshing rate of the screen, in response to the video frame rate being less than a refreshing rate of the screen, to allow the video frame rate of the video to be greater than or equal to the refreshing rate after the modification, includes: modifying the video frame rate based on the refreshing rate of the screen.

In some embodiments, the modifying the video frame rate based on the refreshing rate of the screen, includes: increasing the video frame rate by inserting a new video frame based on the refreshing rate of the screen.

In some embodiments, the video data is online video data. The method further includes: after the modifying the video frame rate based on the refreshing rate of the screen, obtaining a video file identifier and a sending terminal corresponding to the video data; and sending an updating request to the sending terminal. The updating request includes the refreshing rate of the screen and the video file identifier corresponding to the video data; and the updating request is configured to instruct the sending terminal, which receives the updating request, to modify remaining video data that corresponds to the video file identifier and has not been sent to the electronic device based on the refreshing rate of the screen.

In some embodiments, the video file identifier is a name or a login user name of the terminal corresponding to the video data.

In some embodiments, the number of video data is more than one, and the modifying the video frame rate based on the refreshing rate of the screen, includes: updating the video frame rates of the one or more online video data to be the refreshing rate of the screen.

According to a second aspect, embodiments of the present disclosure provide an electronic device, including: a screen; at least one processor; and at least one non-transitory memory, which includes program code. The at least one non-transitory memory and the program code are configured to, with the at least one processor, cause the electronic device to perform operations of: acquiring a video frame rate of video data; and modifying at least one of the video frame rate of the video data and the refreshing rate of the screen in response to the video frame rate being less than a refreshing rate of the screen, the video frame rate of the video being greater than or equal to the refreshing rate.

In some embodiments, the number of video data is more than one, and the number of video frame rates is more than one, and while the modifying at least one of the video frame rate of the video data and the refreshing rate of the screen, in response to the video frame rate being less than a refreshing rate of the screen, the video frame rate of the video being greater than or equal to the refreshing rate, the program code is further configured to execute the operations of: taking video data corresponding to the video frame rate less than the refreshing rate of the screen as a first video data, in response to the video frame rate less than the refreshing rate of the screen being in the more than one video frame rates; taking a lowest video frame rate of the first video data as a target frame rate; and modifying the refreshing rate of the screen based on the target frame rate, the video frame rate of the first video data being greater than or equal to the modified refreshing rate of the screen.

In some embodiments, while modifying the refreshing rate of the screen based on the target frame rate, the program code is further configured to execute the operations of: modifying the refreshing rate of the screen to be the target frame rate.

In some embodiments, the program code is further configured to execute the operations of: after the modifying the refreshing rate of the screen to be the target frame rate, in the more than one video frame rates, modifying any video frame rate greater than the target frame rate to be the target frame rate.

In some embodiments, while modifying any video frame rates greater than the target frame rate to be the target frame rate, the program code is further configured to execute the operations of: taking video data corresponding to the video frame rate greater than the target frame rate as a second video data; and performing a re-sampling process on the second video data, and reducing a video frame rate of the second video data to be the target frame rate.

According to a third aspect, a computer readable medium is provided and has a computer code stored therein. The computer code is capable of being invoked by a processor to execute operations of: acquiring a video frame rate of video data; and modifying at least one of the video frame rate of the video data and the refreshing rate of the screen in response to the video frame rate being less than a refreshing rate of the screen, the video frame rate of the video being greater than or equal to the refreshing rate.

As shown in FIG. 1, FIG. 1 is a diagram of a framework of playing a video according to an embodiment of the present disclosure. In detail, in response to an operating system acquiring data to be displayed, the operating system may decode audio and video data. Typically, a video file includes a video stream and an audio stream. Packaging formats of the audio and video data in various video formats are various. A process of synthesizing the audio stream and the video stream may be referred as muxer, whereas a process of separating the audio stream and the video stream out of the video file may be referred as demuxer. Playing the video file may require the audio stream and the video stream to be separated from the video file and decoded. A decoded video frame may be rendered directly. An audio frame may be sent to a buffer of an audio output device to be played. Timestamp of video rendering the video frame and timestamp of playing the audio frame must be controlled to be synchronous.

In detail, video decoding may include hard decoding and soft decoding. The hard decoding refers to enabling a graphics processing unit (GPU) to process a part of the video data which is supposed to be processed by a central processing unit (CPU). As a computing capacity of the GPU may be significantly greater than that of the CPU, a computing load of the CPU may be significantly reduced. As an occupancy rate of the CPU is reduced, the CPU may run some other applications at the same time. As a relatively better CPU, such as i5 2320, AMD, or any four-core processor, a difference between the hard decoding and the soft decoding is just a matter of personal preference.

In detail, as shown in FIG. 1, a media framework may acquire a video file to be played on the client from an API of the client, and may send the video file to a video decoder (Video Decode). The media framework may be installed in an Android operating system, and a basic framework of the media framework of the Android operating system may be composed of a MediaPlayer, a MediaPlayerService, and a Stagefrightplayer. The media player has a client/server (C/S) structure. The MediPlayer serves as the client of the C/S structure. The MediaPlayerService and the Stagefrightplayer serve as the server side of the C/S structure and play a role in playing a multimedia file. The server side may achieve and respond to a request of the client through the Stagefrightplayer. The Video Decode is an ultra-video decoder integrating functions of audio decoding, video decoding, and playing the multimedia file, and configured to decode the video data.

The soft decoding refers to the CPU performing video decoding through software, and invoking the GPU to render, synthesize, and play the video on a display screen after the decoding. On the contrary, the hard decoding refers to performing the video decoding by a certain daughter card only, without the CPU.

Regardless of hard decoding or soft decoding, after the video data is decoded, the decoded video data may be sent to SurfaceFlinger. The decoded video data may be rendered and synthesized by SurfaceFlinger, and displayed on the display screen. The SurfaceFlinger is an independent service, and receives a surface of all Windows as an input. The SurfaceFlinger may calculate a position of each surface in a final synthesized image based on parameters, such as ZOrder, transparency, a size, and a position. The SurfaceFlinger may send the position of each surface to HWComposer or OpenGL to generate a final display Buffer, and the final display Buffer may be displayed on a certain display device.

As shown in FIG. 1, in soft decoding, the CPU may decode the video data and send the decoded video data to SurfaceFlinger to be rendered and synthesized. In hard decoding, the GPU may decode the video data and send the decoded video data to SurfaceFlinger to be rendered and synthesized. The SurfaceFlinger may invoke the GPU to achieve image rendering and synthesis, and display the rendered and synthesized image on the display screen.

As shown in FIG. 1, in soft decoding, the CPU may decode the video data and send the decoded video data to SurfaceFlinger to be rendered and synthesized. In hard decoding, the GPU may decode the video data and send the decoded video data to SurfaceFlinger to be rendered and synthesized. The SurfaceFlinger may invoke the GPU to achieve image rendering and synthesis, and display the rendered and synthesized image on the display screen.

Figure 2:
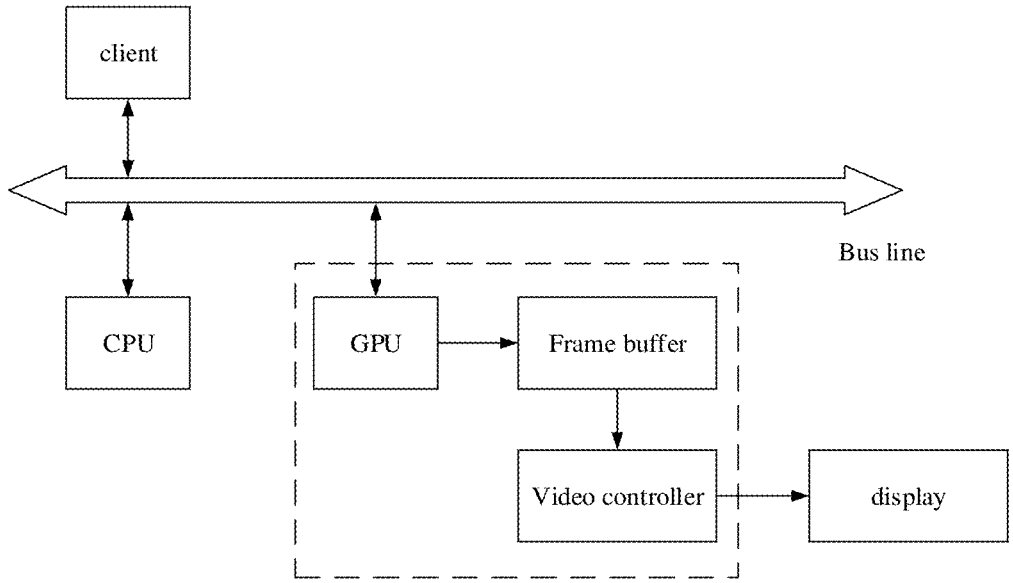
FIG. 2 is a diagram of a framework of rendering an image according to an embodiment of the present disclosure.

In an implementation, a process of rendering the image may be shown in FIG. 2. The CPU may acquire the video file to be played sent from the client, decode the video file, obtain decoded video data after decoding, and send the video data to the GPU. After the GPU completes rendering, a rendering result may be input into a frame buffer (FrameBuffer in FIG. 2). A video controller may read data in the frame buffer line by line based on a HSync signal, and send it to a display screen for display after digital-to-analog conversion.

In addition, the electronic device may further be capable of simultaneously playing a plurality of online videos acquired in real time for various scenarios, such as multi-member videos, multi-member meetings or multi-player games, etc. Each participant may capture a video to be played through a video capturing terminal. A plurality of participants may capture a plurality of videos, and provide the plurality of videos to the electronic device for rendering and synthesizing. The rendered and synthesized videos may be played. In response to the videos captured by a plurality of video capturing terminals having different frame rates, video data captured by one of the video capturing terminals may not reach a video-playing terminal when the video-playing terminal renders the synthesizes the videos, such that the video-playing terminal may not synthesize and display images from all participants.

Figure 3:
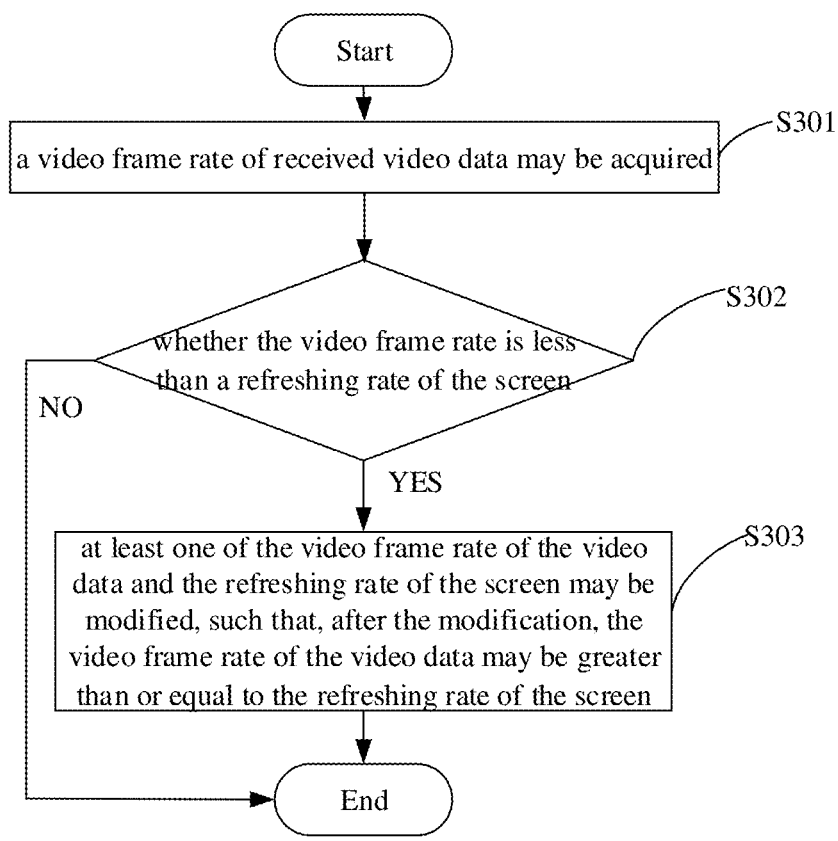
FIG. 3 is a flow chart of a video-processing method according to an embodiment of the present disclosure.

Therefore, in order to solve the above technical problem, as shown in FIG. 3, the present embodiment of the present disclosure provides a video-processing method, applied in an electronic device. The electronic device may include a processor and a screen. In the present embodiment, the processor may be a subject for executing the method. The method may include operations of S301 to S304.

In an operation S301, a video frame rate of received video data may be acquired.

The video data may be an offline video file that is downloaded in advance in the electronic device. Alternatively, the video data may be an online video file. In the embodiment of the present disclosure, the video data may be online video data. Specifically, the electronic device may allow a plurality of online video files to be played. For example, the electronic device may have a split screen for two applications, and each of the two applications may play one video file, so as to allow the plurality of video files to be played on one screen. In detail, the electronic device may acquire a plurality of online video data. The online video data may correspond to one video file, and the online video data may be data that the video file has sent to the electronic device. For example, the video file may be a certain movie, and the electronic device may receive data of playing time of the certain movie from 0 to 10 minutes. In this case, the online video data corresponding to the certain movie may be the data of the playing time of the certain movie from 0 to 10 minutes. After the client acquires each online video data, the client may decode each online video data, obtain a layer which corresponds to each online video data and is to be rendered, merge and display layers of various video data, such that a plurality of video images may be displayed on the screen.

In an implementation, the electronic device may include a plurality of clients capable of playing video files. When a client of the electronic device plays a video, the electronic device may obtain the video file to be played and decode the video file. In detail, the above-mentioned soft decoding or hard decoding may be performed to decode the video file. After decoding, the electronic device may obtain multi-frame image data which corresponds to the video file and is to be rendered, render the multi-frame image data, and display the rendered image data on the screen.

In detail, the processor of the electronic device may include a central processing unit and a graphic processing unit. In a specific implementation of obtaining the multi-frame image data which corresponds to the video file and is to be rendered, the central processing unit may obtain the video file to be played sent by the client. As an implementation, the central processing unit may obtain a video playing request sent by the client, the video playing request may include the video file to be played. In detail, the video playing request may include identity information of the video file to be played, the identity information may be a name of the video file. The video file can be found in a storage space where the video file is stored, based on the identity information.

As an implementation, when the client is playing the video, the client may invoke a video playing module in the electronic device to parse and decode the online video file to be played. The client may have an icon on a system desktop, and the user may click the icon of the client to activate the client. For example, activation of the client may be confirmed based on a package name of the client clicked by the user, the package name of the client for playing the video may be obtained from a code of a background of the system, and a format of the package name may be: com.android.video.

A video list interface of the client shows display content corresponding to a plurality of videos. The display content corresponding to the plurality of videos may include a thumbnail corresponding to each of the plurality of videos. The thumbnail may serve as a touch button. The user may click the thumbnail, and the client may detect the thumbnail selected and clicked by the user, such that the online video file to be played may be determined.

In respond to a video selected by the user in the video list, the client may enter a video playing interface. A play button on the video playing interface may be clicked. The client may monitor the user's touch operation, such that a type of the video that is currently clicked by the user may be detected. In detail, the play button may be set with preset attribute. The video to be played selected by the user may be determined by detecting the attribute of the play button corresponding to the touch operation.

For example, the client may be a video chat client and a video file generated after clicking a video chat button may be the online video file to be played. The online video file to be played may be video data generated during voice chat. In another example, each video on a video category interface of the client may correspond to one online video file to be played. When a plurality of users are clicked, multi-member online video may be achieved.

In this way, identifiers of all online video files that are to be played by the client may be determined. Subsequently, video data that has been sent to the electronic device and corresponds to each online video file may be taken as the online video data corresponding to the online video file. Subsequently, the online video data may be analyzed, such that parameters of the online video data, such as a format, resolution, a sample rate, a bit rate and a frame rate of the online video data, may be obtained.

In an operation S302, it may be determined whether the video frame rate is less than a refreshing rate of the screen.

As an implementation, the number of the video data may be more than one. An implementation of determining whether the video frame rate is less than the refreshing rate of the screen may be determining whether the video frame less than the refreshing rate of the screen is present in all video frame rates.

Specifically, after obtaining the video frame rate of each online video data, video frame rates of all online video data may be placed in an order. For example, all video frame rates may be placed in an order from a lowest video frame rate to a highest video frame rate, obtaining a video frame rate sequence. In this case, each of all video frame rates may be compared with the refreshing rate of the screen one by one, starting from the lowest video frame rate, in order to determine whether the frame rate less than the refreshing rate of the screen is present in the video frame rate sequence. In detail, whether the lowest video frame rate is less than the refreshing rate of the screen may be determined first. In response to the lowest video frame rate being less than the refreshing rate of the screen, it may be determined that the video frame rate less than the refreshing rate of the screen is present in all video frame rates. In response to the lowest video frame rate being greater than or equal to the refreshing rate of the screen, it may be determined that all video frame rates are higher than or equal to the refreshing rate of the screen, i.e., the video frame rate less than the refreshing rate of the screen is not present in all video frame rates.

For example, the online video data currently received by the electronic device may include Video 1, Video 2, Video 3 and Video 4, a video frame rate of Video 1 may be F1, a video frame rate of Video 2 may be F2, a video frame rate of Video 3 may be F3, and a video frame rate of Video 4 may be F4. For example, F1 may be 15 Hz, F2 may be 40 Hz, F3 may be 50 Hz, and F4 may be 20 Hz. The video frame rate sequence obtained by placing the video frame rates from the lowest to the highest may be [F1, F4, F2, F3]. In response to the refreshing rate of the screen being 40 Hz, F1 and F4 may be less than the refreshing rate of the screen, F2 may be equal to the refreshing rate of the screen, and F3 may be greater than the refreshing rate of the screen.

In an operation S303, at least one of the video frame rate of the video data and the refreshing rate of the screen may be modified, such that, after the modification, the video frame rate of the video data may be greater than or equal to the refreshing rate of the screen.

As an implementation, the number of the video data may be more than one, and online video data corresponding to the video frame rate less than the refreshing rate may be taken as target video data.

Specifically, the lowest video frame rate in the above video frame rate sequence may be compared to the refreshing rate of the screen. In response to the lowest video frame rate being less than the refreshing rate of the screen, the lowest video frame rate may be stored in a target video data sequence. Subsequently, a next video frame rate after the lowest video frame rate in the video frame rate sequence may be selected and compared with the refreshing rate of the screen. Searching video frame rates may be terminated in response to the video frame rate greater than or equal to the refreshing rate of the screen being found from the video frame rate sequence. In this way, all video frame rates less than the refreshing rate may be stored in the target video data sequence. The online video data corresponding to each video frame rate in the target video data sequence may be taken as the target video data.

For example, among the above-mentioned Video 1, Video 2, Video 3, and Video 4, F1 and F2 may be less than the refreshing rate of the screen, and may be stored in the target video data sequence. Video 1 and Video 2 may be taken as the target video data.

In an operation S304, at least one of the video frame rate of the video data and the refreshing rate of the screen may be modified, such that, after the modification, the video frame rates of all online video data may be greater than or equal to the refreshing rate of the screen.

After determining that the video frame rate less than the refreshing rate of the screen is present in the plurality of online video data that are currently received, i.e., the target video data is obtained, the video frame rate of the target video data may be modified, such that after the modification, the video frame rates of all online video data may be greater than or equal to the refreshing rate of the screen. Alternatively, the refreshing rate of the screen may be reduced, such that the modified refreshing rate may be less than or equal to video frame rates of all online video data.

The number of frames transmitted in a video frame rate of one second may be interpreted as the number of frames that the graphic processing unit may process per second, and may also be interpreted as the number of images recorded in one second. For example, a video frame rate of 15 Hz may be expressed as 15 fps, indicating that 15 frames may be recorded in one second, and the processor of the electronic device may capture one frame every 66.67 ms.

The refreshing rate of the screen may be a rate at which images are updated on the screen, i.e., the number of images displaying on the screen per second. After obtaining the online video data to be played, the electronic device may decode the online video data to obtain the corresponding multi-frame image data and may store the multi-frame image data in a frame buffer. Based on the refreshing rate of the screen, the electronic device may read the multi-frame image data from the frame buffer frame by frame, render and synthesize the multi-frame image data, and display the rendered and synthesized multi-frame image data on the screen.

In response to the video frame rate of the online video data being less than the refreshing rate of the screen, when acquiring the image data to be displayed based on the refreshing rate of the screen, the image data may not be decoded or may not be rendered and synthesized appropriately, such that the image data cannot be displayed. For example, the video frame rate of a first online video data is 15 Hz, and the refreshing rate of the screen is 40 Hz, the processor of the electronic device may obtain a frame to be displayed and store the frame in the frame buffer every 66.67 ms. The screen may obtain a frame from the frame buffer every 25 ms and display the frame on the screen. In this way, taking 0ms as a starting point, at a time point of 25 ms, the image to be displayed may not be present in the frame buffer and cannot be displayed on the screen. After another 25 ms, at a time point of 50 ms, the image to be displayed may still not be present in the frame buffer and cannot be displayed on the screen. At a time point of 66.67 ms, the image to be displayed may be stored in the frame buffer. At a time point of 75 ms, the graphic processing unit may obtain the image to be displayed from the frame buffer, a frame of the first online video data may be obtained and displayed normally.

When a plurality of video images are displayed on the screen, in response to a video frame rate of the online video data corresponding to some of a plurality of video images being less than the refreshing rate of the screen, whereas a video frame rate of the online video data corresponding to the rest of the plurality of video images being greater than or equal to the refreshing rate of the screen, the online video having the video frame rate greater than or equal to the refreshing rate of the screen may be played frame by frame based on the refreshing rate of the screen. For the online video having the video frame rate less than the refreshing rate of screen, the video image may be frozen, while playing the other videos frame by frame. That is, a previous image may stay on the screen, a lag may occur.

The video frame rate of the online video less than the refreshing rate of the screen may be increased to be greater than or equal to the refreshing rate of the screen. For example, a new video frame may be inserted to increase the video frame rate, or the refreshing rate of the screen may be reduced to be less than or equal to the lowest video frame rate.

In detail, as an implementation, after the operation S304, the method may further include displaying all online video data on the screen based on the refreshing rate of the screen.

In detail, while the electronic device obtains a plurality of online video data to be played, the electronic device may decode each of the plurality of online video data to be played to obtain corresponding multi-frame image data.

As an implementation, the graphic processing unit may decode the online video data to be played to obtain the multi-frame image data corresponding to the online video data to be played. Specifically, the central processing unit may invoke the playing module to parse the online video data to be played to obtain a video stream and an audio stream corresponding to the online video data to be played. The playing module may be the MediaExtractor module or the FFmpeg module in the Android operating system. The FFmpeg module may be an open source and cross-platform video and audio streaming framework, which is free software and is licensed under LGPL or GPL (depending on a selected component). The playing module may provide a complete solution for recording, converting, and streaming the audio and the video, and may include an abundant audio/video codec library libavcodec.

The central processing unit may send the video stream to the graphic processing unit. The graphic processing unit may decode the video stream and obtain the multi-frame image data corresponding to the video stream. Subsequently, the graphic processing unit may perform synthesis on the multi-frame image data. Specifically, the synthesis may be performed in the frame buffer shown in FIG. 2, i.e., by performing on-screen rendering on the multi-frame image data, or by performing off-screen rendering on the multi-frame image data.

As an implementation, an off-screen rendering buffer may be pre-set in the GPU. Specifically, the GPU may invoke a rendering client module to render multi-frame image data to be rendered, perform synthesis on the multi-frame image data, and send the rendered and synthesized image to the screen to be displayed. Specifically, the rendering client module may be an OpenGL module. A final location of an OpenGL rendering pipeline may be in the frame buffer. The frame buffer may be a series of two-dimensional pixel storage arrays and may include a color buffer, a depth buffer, a stencil buffer, and an accumulation buffer. By default, the OpenGL module may use the frame buffer provided by a windowing system.

An extension GL_ARB_framebuffer_object of the OpenGL module may provide a way to create an additional Frame Buffer Object (FBO). By using the frame buffer object, the OpenGL module may redirect the frame buffer drawn in a window to the FBO.

Another buffer, i.e., the off-screen rendering buffer, may be set outside the frame buffer via FBO. Subsequently, the acquired multi-frame image data may be stored to the off-screen rendering buffer. Specifically, the off-screen rendering buffer may be a storage space corresponding to the graphic processing unit. That is, the off-screen rendering buffer does not have a space for storing images. The off-screen rendering buffer may map with a storage space in the graphic processing unit, and the images may actually be stored in the storage space in the graphic processing unit corresponding to the off-screen rendering buffer.

By binding the multi-frame image data to the off-screen rendering buffer, the multi-frame image data may be stored in the off-screen rendering buffer, i.e., the multi-frame image data may be found in the off-screen rendering buffer.

After storing the multi-frame image data to the off-screen rendering buffer, the multi-frame image data may be rendered in the off-screen rendering buffer. Specifically, display enhancement may be performed on multi-frame buffered data. For example, image parameters of the multi-frame image data in the off-screen rendering buffer may be optimized. Optimizing the image parameters may include at least one of exposure enhancement, denoising, edge sharpening, contrast increasing or saturation increasing.

The exposure enhancement may be performed to increase brightness of the image. Brightness of areas having low brightness values may be increased through a histogram of the image. Alternatively, brightness of the image may be increased by non-linear superposition. In detail, I represents a dark image to be processed, and T represents a brighter image after being processed. The exposure enhancement may be achieved by means of $T(x)=I(x)+(1-I(x))*I(x)$. Each of the T and the I may be an image having a value in a range of [0, 1]. In response to brightness increasing being not achieved effectively by performing the exposure enhancement only once, the exposure enhancement may be performed iteratively.

Denoising the image data may be performed to remove noise of the image. In detail, the image may be affected and interfered by various noise while being generated and sent, causing quality of the image to be reduced, and therefore, image processing and a visual effect of the image may be negatively affected. There are many types of noise, such as electrical noise, mechanical noise, channel noise and other types of noise. Therefore, in order to suppress the noise, improve the quality of the image, and facilitate higher-level processing, a denoising pre-process may be performed on the image. Based on probability distribution of the noise, the noise may be classified as Gaussian noise, Rayleigh noise, gamma noise, exponential noise and uniform noise.

In detail, the image may be denoised by a Gaussian filter. The Gaussian filter may be a linear filter able to effectively suppress the noise and smooth the image. A working principle of the Gaussian filter may be similar to that of an average filter. An average value of pixels in a filter window may be taken as an output. A coefficient of a template of the window in the Gaussian filter may be different from that in the average filter. The coefficient of the template of the average filter may always be 1. However, the coefficient of the window template of the Gaussian filter may decrease as a distance between a pixel in the window and a center of the window increases. Therefore, a degree of blurring of the image caused by the Gaussian filter may be smaller than that caused by the average filter.

For example, a 5×5 Gaussian filter window may be generated. The center of the window template may be taken as an origin of coordinates for sampling. Coordinates of each position of the template may be brought into the Gaussian function, and a value obtained may be the coefficient of the window template. Convolution may be performed on the Gaussian filter window and the image to denoise the image.

Edge sharpening may be performed to enable a blurred image to become clear. Generally, the edge sharpening may be achieved by two means: i.e., by differentiation and by high-pass filtering.

The contrast increasing may be performed to enhance the quality of the image, enabling colors in the image to be vivid. In detail, the image enhancement may be achieved by performing contrast stretching, and the contrast stretching may be a gray-scale transformation operation. Gray-scale values may be stretched to cover an entire interval of 0-255 through the gray scale transformation. In this way, the contrast may be significantly enhanced. A following formula may be taken to map a gray value of a certain pixel to a larger gray-scale space.

$$I(x,y)=[(I(x,y)-I\min)/(I\max-I\min)](MAX-MIN)+MIN$$

The Imin represents a minimal gray scale value of an original image, and the Imax represents a maximal gray scale value of the original image. The MIN represents a minimal gray scale value of the gray scale space that a pixel is stretched to reach, and the MAX represents a maximal gray scale value of the gray scale space that a pixel is stretched to reach.

Figure 4:
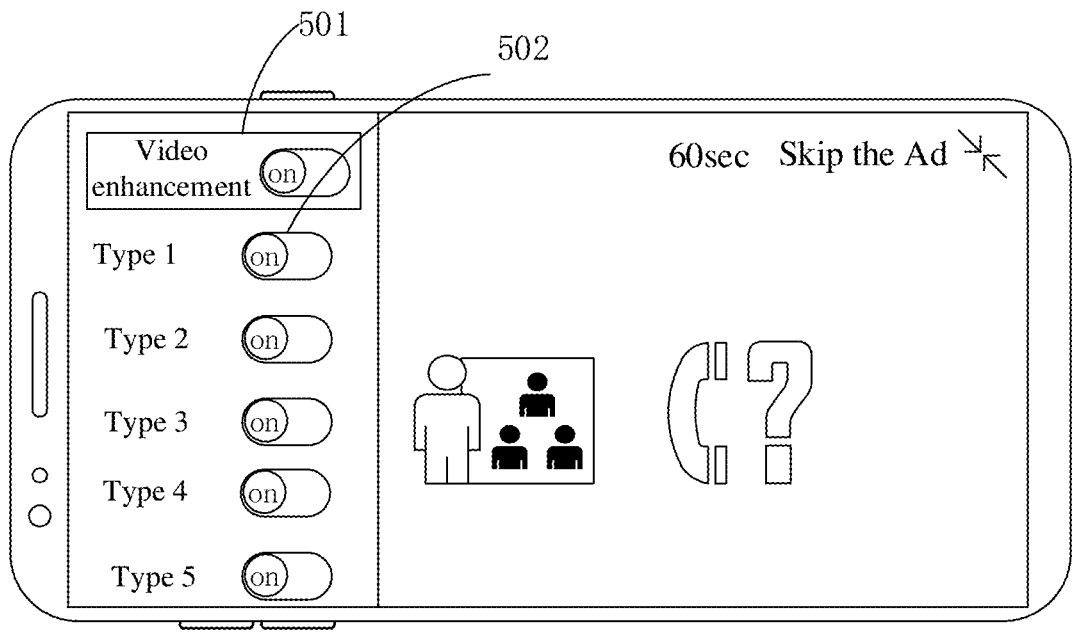
FIG. 4 is a schematic view of a selection interface for a type to be optimized according to an embodiment of the present disclosure.

Specifically, the user may set a type to be optimized for the video file to be played in the electronic device, and the type to be optimized may be a type of a target object, for example, the type may be male, female, the sky, a mountain, a river, or a sign, etc. Specifically, the user may enter the type to be optimized on the video playing interface. As shown in FIG. 4, a master switch 501 for video enhancement and a plurality of sub-switches 502 for each target object type are displayed on the video playing interface. Specifically, the master switch 501 for video enhancement may be configured to activate or deactivate the video enhancement. The video enhancement may be activated to optimize image data of the video file. When the master switch 501 for video enhancement is activated, the user may select and activate one or more certain sub-switches 502. As shown in FIG. 4, Type 1 may correspond to a target object type, such as male. Type 2 may correspond to another target object type, such as female. Texts of Type 1 and Type 2 may be exemplary only. Practically, the texts may be changed based on specific target object types, for example, the texts of Type 1 may be changed to be "a male character".

When the master switch 501 for video enhancement is activated, and the user may select and turn on the type of the target object type that needs to be optimized. That is, the sub-switch 502 for the type that needs to be optimized may be activated, and the electronic device may acquire the type to be optimized corresponding to the video file.

When the master switch 501 for video enhancement is deactivated, the sub-switch 502 corresponding to each type in a type selection window may be gray. That is, the sub-switch 502 cannot be selected to be activated or deactivated, i.e., the sub-switch 502 may not respond to any operation performed on the sub-switch.

Figure 5:
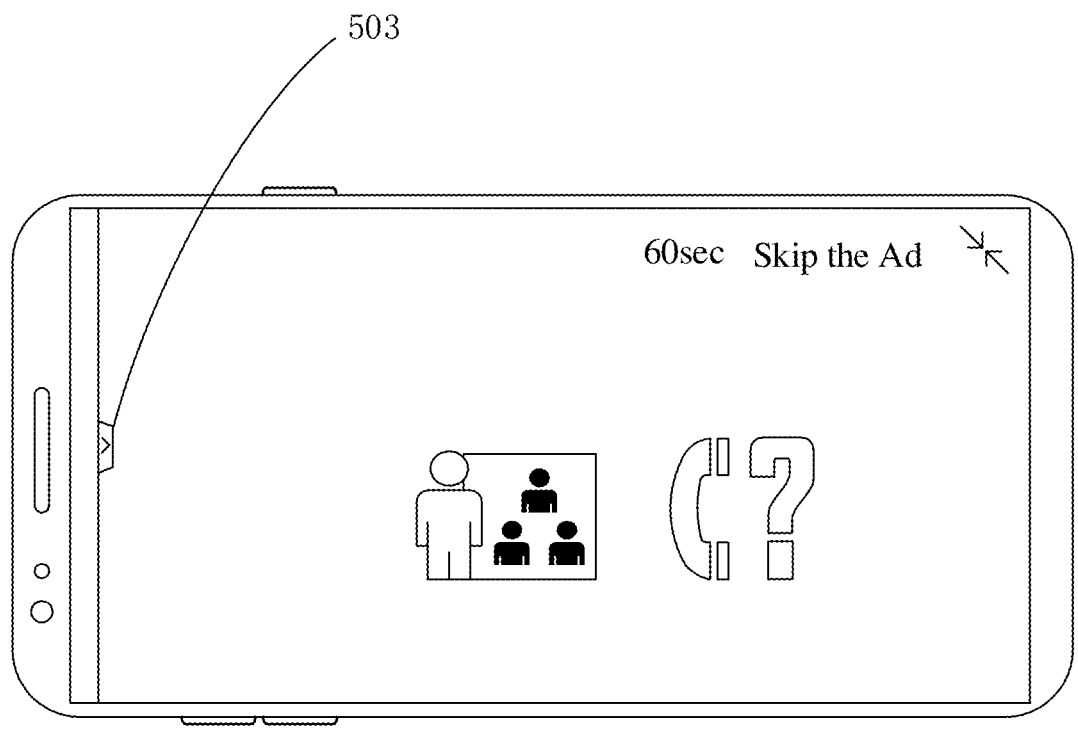
FIG. 5 is a schematic view of a hiding effect of a selection interface for a type to be optimized according to an embodiment of the present disclosure.

In addition, a selection interface for selecting the type to be optimized shown in FIG. 4 may be hidden. Specifically, as shown in FIG. 5, a sliding button 503 may be set on a side of the type selection window. The type selection window may be hidden and slid out by performing operations on the sliding button 503. As an implementation, when the type selection window is in a hidden state, the sliding button 503 may be clicked to allow the sliding button 503 to be slide out. When the type selection window is in a slid-out state, the sliding button 503 may be clicked to hide the sliding button 503.

In addition, while selecting the type to be optimized, the user may enter an indication of an optimization level. Based on the indication of the optimization level, an optimization level for the type to be optimized may be adjusted. For example, in response to the exposure enhancement being selected, the user may enter an indication of an exposure enhancement level, such as entering through an input interface or by pressing a volume key. For example, each press on a volume up key may increase the exposure by 2%, and correspondingly, each press on a volume down key may decrease the exposure by 2%. In this way, the user may adjust the optimization level with arbitrary.

Each online video data may be stored in the frame buffer after being optimized. After the refreshing rate of the screen is taken out, synthesis may be performed on the online video data, and the synthesized video data may be displayed on the screen. Specifically, each online video data may be decoded to obtain the multi-frame image data, which is to be rendered and may correspond to the online video data, and store the multi-frame image data in the image buffer. One frame of image data, which is to be rendered and may correspond to the online video data, may be obtained from the image buffer based on the refreshing rate of the screen. The acquired plurality of image data to be rendered may be rendered and synthesized into one frame of a synthesized image. The synthesized image may be displayed on the screen.

Figure 6:
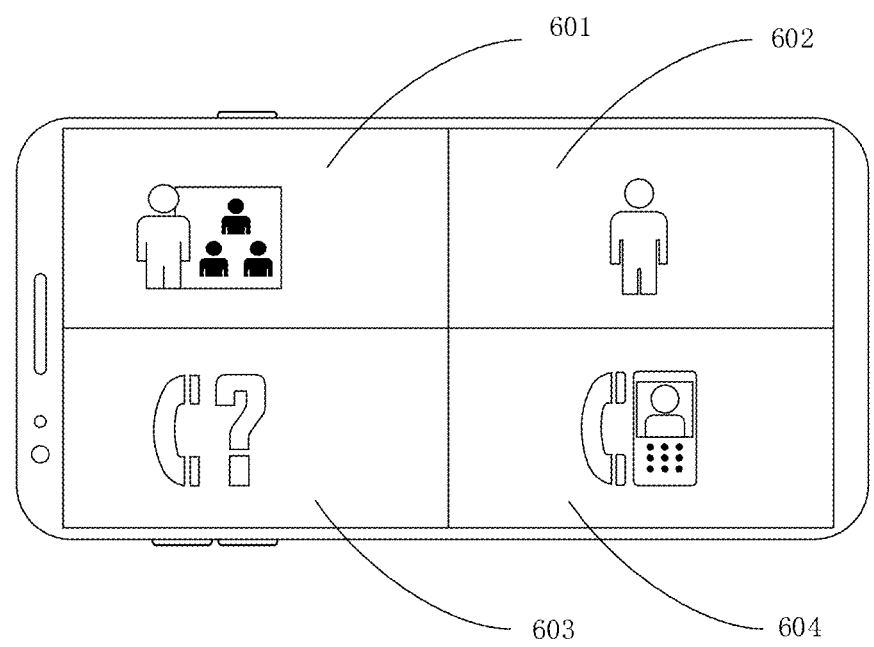
FIG. 6 is a schematic view of an interface for playing a video according to an embodiment of the present disclosure.

As shown in FIG. 6, an interface currently displayed on the screen may include a plurality of sub-interfaces, i.e., a first sub-interface 601, a second sub-interface 602, a third sub-interface 603 and a fourth sub-interface 606. Video files played on the plurality of sub-interfaces may be different. Taking a multi-member conference or multi-member video chatting as an example, a client may be installed in the electronic device, and the client may enable the electronic device to connect to a plurality of terminals. Each terminal may send one online video file to the client. For example, the first sub-interface 601 may correspond to a first online video file sent by a first terminal. The second sub-interface 602 may correspond to a second online video file sent by a second terminal. The third sub-interface 603 may correspond to a third online video file sent by a third terminal. The fourth sub-interface 604 may correspond to a fourth online video file sent by a fourth terminal. In this way, a plurality of videos may be played and observed on the screen.

In order to avoid image frozen while playing the video in the above interface, which may be caused by with the video frame rate of a certain video being less than the refreshing frame of the screen, the video frame rate of the online video less than the refreshing rate of the screen may be increased to be higher than the refreshing rate of the screen. For example, a new video frame may be inserted. Alternatively, the refreshing frame of the screen may be reduced to be less than or equal to the lowest video frame rate.

Figure 7:
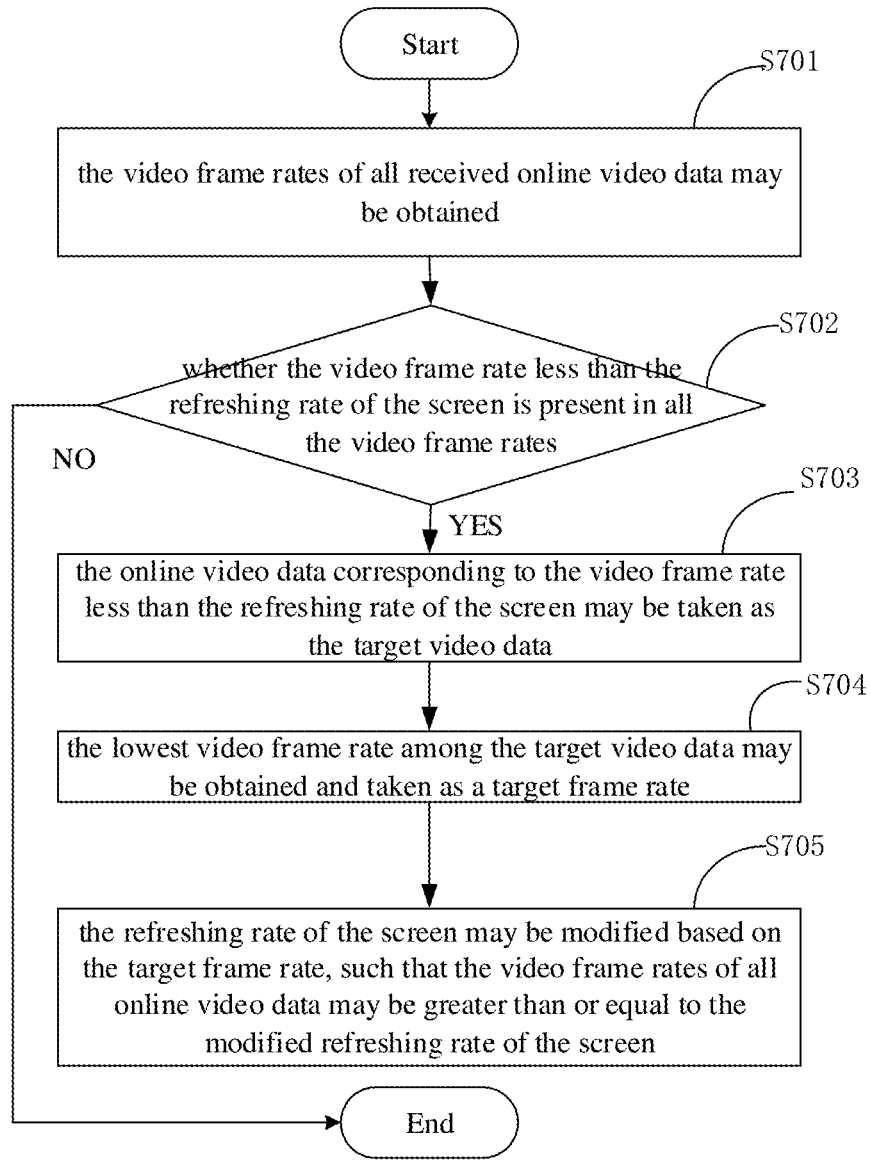
FIG. 7 is a flow chart of a video-processing method according to another embodiment of the present disclosure.

In detail, as shown in FIG. 7, the embodiments of the present disclosure may provide a video-processing method, applied in the electronic device. The electronic device may include a processor and a screen. In the present embodiment, the processor may be a subject for executing the method. Based on the above method embodiment, in the present embodiment, the refreshing rate of the screen may be reduced to enable the video frame rates of all online video data to be greater than or equal to the modified refreshing rate of the screen. In detail, the method may include operations of S701 to S705.

In an operation S701, the video frame rates of all received online video data may be obtained.

In an operation S702, it may be determined whether the video frame rate less than the refreshing rate of the screen is present in all the video frame rates.

In an operation S703, the online video data corresponding to the video frame rate less than the refreshing rate of the screen may be taken as the target video data.

In an operation S704, the lowest video frame rate among the target video data may be obtained and taken as a target frame rate.

Specifically, while performing the operation of determining whether the video frame rate less than the refreshing rate of the screen is present among all the video frame rates, the video frame rates of all online video data may be placed in an order from the lowest to highest. For example, the video frame rate sequence of the above videos may be obtained, and a first video frame rate in the video frame rate sequence may be taken as the target frame rate while performing the operation of S704.

As another implementation, while performing the operation of determining whether the video frame rate less than the refreshing rate of the screen is present in all the video frame rates, each video frame rate may be compared to the refreshing rate of the screen one by one, instead of placing the video frame rates in the order. Any video frame rate less than the refreshing frame rate of the screen may be taken as a candidate video frame rate, and the online video data corresponding to the candidate video frame rate may be taken as the target video data.

The online video data having the lowest video frame rate may be obtained from the target video data. Specifically, it may be determined whether the candidate video frame rate is greater than a predetermined value. In response to the candidate video frame rate being greater than the predetermined value, candidate video frame rates may be placed in an order from the highest video frame rate to the lowest video frame rate. A first video frame rate in the video frame rate sequence may be taken as the target frame rate. In response to the candidate video frame rate being less than or equal to the predetermined value, an absolute value of a difference between each candidate video frame rate and the refreshing rate of the screen may be obtained, the absolute value of the largest difference may be taken as the target frame rate.

The predetermined value may be determined by the user as needed, for example, the predetermined value may be 1.

The predetermined value may be reasonably set to reasonably balance a computing amount of the processor and power consumption.

In an operation of S705, the refreshing rate of the screen may be modified based on the target frame rate, such that the video frame rates of all online video data may be greater than or equal to the modified refreshing rate of the screen.

After the target frame rate is obtained, the target frame rate may be less than or equal to the refreshing rate of the screen, and the refreshing rate of the screen may be modified based on the target frame rate. As an implementation, the refreshing rate of the screen may be modified to be less than the target frame rate. For example, the online video data currently obtained by the electronic device may be vdata 1, vdata 2, vdata 3 and vdata 4. The video frame of vdata 1 may be 15 Hz. The video frame of vdata 2 may be 40 Hz. The video frame of vdata 3 may be 50 Hz. The video frame of vdata 4 may be 20 Hz. The refreshing rate of the screen may be 40 Hz. The candidate video frame rates may be 15 Hz and 20 Hz, and the target frame rate may be 15 Hz. The refreshing rate of the screen may be modified based on 15 Hz. For example, the refreshing rate of the screen may be modified to be less than 15 Hz, such as 14 Hz. As another implementation, the refreshing frame rate of the screen may be modified to be 15 Hz. Modifying the refreshing rate of the screen based on the target frame rate may be performed by modifying the refreshing rate of the screen to be the target frame rate. In this way, none of the online video data may have lagging while being played, the refreshing rate of the screen may be set reasonably, and the refreshing rate of the screen may not be excessively low, ensuring the user's viewing effect.

Therefore, by taking the lowest video frame rate of all online video data as the refreshing rate of the screen, i.e., modifying the refreshing rate of the screen to be the lowest video frame rate of all videos, each time when a frame of the video is displayed on the screen based on the refreshing rate of the screen, the image of each online video data may already be stored in the frame buffer corresponding to the screen. In this way, the processor may obtain the image of the video from the frame buffer, such that the image may be displayed properly.

In addition, after determining that the video frame rate less than the refreshing rate of the screen is present in all video frame rates, a specified time period may be delayed. The decoder may be invoked to decode each online video data within the specified time period, and the image to be rendered corresponding to each online video data may be obtained. The image to be rendered corresponding to each online video data may be stored in the frame buffer. After the end of the specified time period, the online video data corresponding to the video frame rate less than the refreshing frame rate may be taken as the target video data, and the subsequent operations may be performed.

The online video data may be continuously decoded and stored in the frame buffer within the specified time period, such that the image frame of each online video data may be pre-stored in the frame buffer. When the processor obtains the image frame from the frame buffer in response to the refreshing rate of the screen, the image of each online data is able to be obtained. It should be noted that the image frame after decoding the online video data may still be optimized within the specified time period, and a specific optimization process may be referred to the above-mentioned embodiment.

In addition, after modifying the refreshing rate of the screen to be the target frame rate, the video frame rate of all the online video data may also be modified to be the target frame rate. Specifically, two online video data may be provided, one of the two online video data may be a first online video data, and the other one may be a second online video data. The video frame rate of the first online video data may be 15 Hz, and the video frame rate of the second online video data may be 40 Hz. The refreshing rate of the screen may be 20 Hz. The processor of the electronic device may obtain one frame of the first online video data to be displayed every 66.67 ms, and may store the obtained frame in the frame buffer. The processor of the electronic device may obtain one frame of the second online video data to be displayed every 25 ms, and may store the obtained frame in the frame buffer. The screen may obtain a frame from the frame buffer and display the frame on the screen every 50 ms. Taking 0ms as a staring time point, at a time point of 25 ms, a first frame of the second online video data to be displayed may be stored in the frame buffer, and at a time point of 50 ms, a second frame of the second online video data to be displayed may be stored in the frame buffer. However, at this time point, the first online video data does not have any image to be displayed is stored in the frame buffer. At the time point of 50 ms, the processor may obtain the image to be displayed in the frame buffer based on the refreshing rate of the screen, and the second frame of the second online video data to be displayed may be obtained. Specifically, each online video data has an independent storage space in the frame buffer, and only one image may be stored in the storage space. That is, at the time point of 50 ms, when the second frame of the second online video data to be displayed is stored to the frame buffer, the first frame of the second online video data to be displayed may be covered, i.e., the first frame of the second online video data to be displayed may be cleared, and the second frame of the second online video data to be displayed may be displayed. The first frame to be displayed may be wasted. By changing the video frame rates of all online video data to be the target frame rate, excessive resource waste may be avoided. For example, the video frame rate of the second online video data may be reduced to be 20 Hz. When the refreshing rate of the screen arrives, the first frame of the second online video data may be stored in the frame buffer waiting to be displayed. Further, the first frame may be optimized for video enhancement. In this way, when the video frame rate of the second online video data is 40 Hz, a situation of displaying only the second frame may be avoided, and resource waste caused by performing operations on the first frame may be avoided.

Reducing the video frame rate may be achieved by resampling the online video data. For example, a portion of a plurality of video frames corresponding to each second may be dropped, thereby reducing the video frame rate. For example, following operations may be performed.

In a first way, when a current frame rate of the online video data meets a condition for frame dropping, frame skipping reference may be performed on the online video data based on a preset frame dropping interval.

Alternatively, in a second way, when the current frame rate of the online video data meets a condition for frame dropping, the first preset number of frames may be discarded in an order from a last frame forwardly.

When performing frame dropping, frame dropping may be performed on the online video data by the above two ways. For the first way of frame dropping, while performing the frame skipping reference, a key frame carrying important information may be referenced first, and a non-key frame being less important may be discarded. Alternatively, the preset frame dropping interval may be every other frame or every other two frames. For example, the current frame rate of the online video data may be 24 frames per second. When the first preset frame dropping interval is set to be every other frame, ½ frame skipping reference may be applied for the online video data, i.e., half of the frames may be discarded, and the frame rate of the online video data may be 12 frames per second. Alternatively, when the first preset frame dropping interval is set to be every other two frames, ⅓ frame skipping reference may be applied for the online video data, and the frame rate of the online video data may be 8 frames per second. For the second way of reducing the video frame rate, the first preset number may be 10 frames. For example, the current frame rate of the online video data may be 24 frames per second. When the current frame rate of the online video data meets the condition for frame dropping, 10 frames may be discarded in an order from the last one of the 24 frames, and the frame rate of the online video data may be reduced to be 14 frames per second. In addition, in order to avoid mosaic occurring for the online video data, frame dropping may be achieved frame by frame until the frame rate is reduced to match a current network situation. For the second way of reducing the video frame rate, the non-key frame may be less-important frames and the key frame may be important frames. Therefore, when dropping frames backwardly starting from the last frame, the non-key frame, which may be less important, may be discarded first, and the key frame carrying important information may be kept.

A way of increasing the video frame rate may be performed in the following ways.

In a first way, when the current frame rate of the online video data meets a condition for frame-up, the number of frames of the online video data may be increased based on a preset frame-up interval number.

Alternatively, in a second way, when the current frame rate of the online video data meets the condition for frame-up, a second preset number of frames may be added sequentially by adding the frame after the last frame.

While performing frame-up, the above two ways of frame-up may be performed on the online video data. For the first way of frame-up, the preset frame-up interval number may be set to be every other frame or every other two frames. For example, the current frame rate of the online video data may be 7 frames per second. When the preset frame-up interval number is set to be every other two frames, 1 frame is added every two other frames starting from a first frame of the 7 frames, and the frame rate of the online video data may be increased to be 10 frames per second. For the second way of frame-up, the second preset number may be set to 6 frames. For example, the current frame rate of the online video data is 7 frames per second. When the current frame rate of the online video data meets the condition for frame-up, 6 frames may be sequentially added from an end of the 7 frames, and the frame rate of the online video data may be increased to be 13 frames per second. In addition, as performing the frame-up may be easier than performing the frame-dropping, no mosaic may occur for frame-up. Therefore, while increasing the frame rate, two frames may be added each time.

In addition, in the process of frame-up, in order to avoid an effect of lagging caused by adding a video frame that is the same as the frames before and after the added frame, the video frame to be inserted may be determined based on the frames before and after the frame to be inserted. For example, two frames of the online video data may be a first frame and a second frame, and the first frame and the second frame are consecutive. The first frame and the second frame may be analyzed. Specifically, foreground extraction may be performed on the first frame and the second frame. A target object in a moving state may be obtained. A moving trajectory of the target object moving from the first frame to the second frame may be obtained. The moving state of the target object along the moving trajectory may be determined. The moving state and a background may be combined to form the video frame to be inserted. The video frame may be inserted between the first and second frames, thereby increasing the frame rate of the video.

It should be noted that some parts that are not described in detail may be referred to the aforementioned embodiments and will not be repeated herein.

Figure 8:
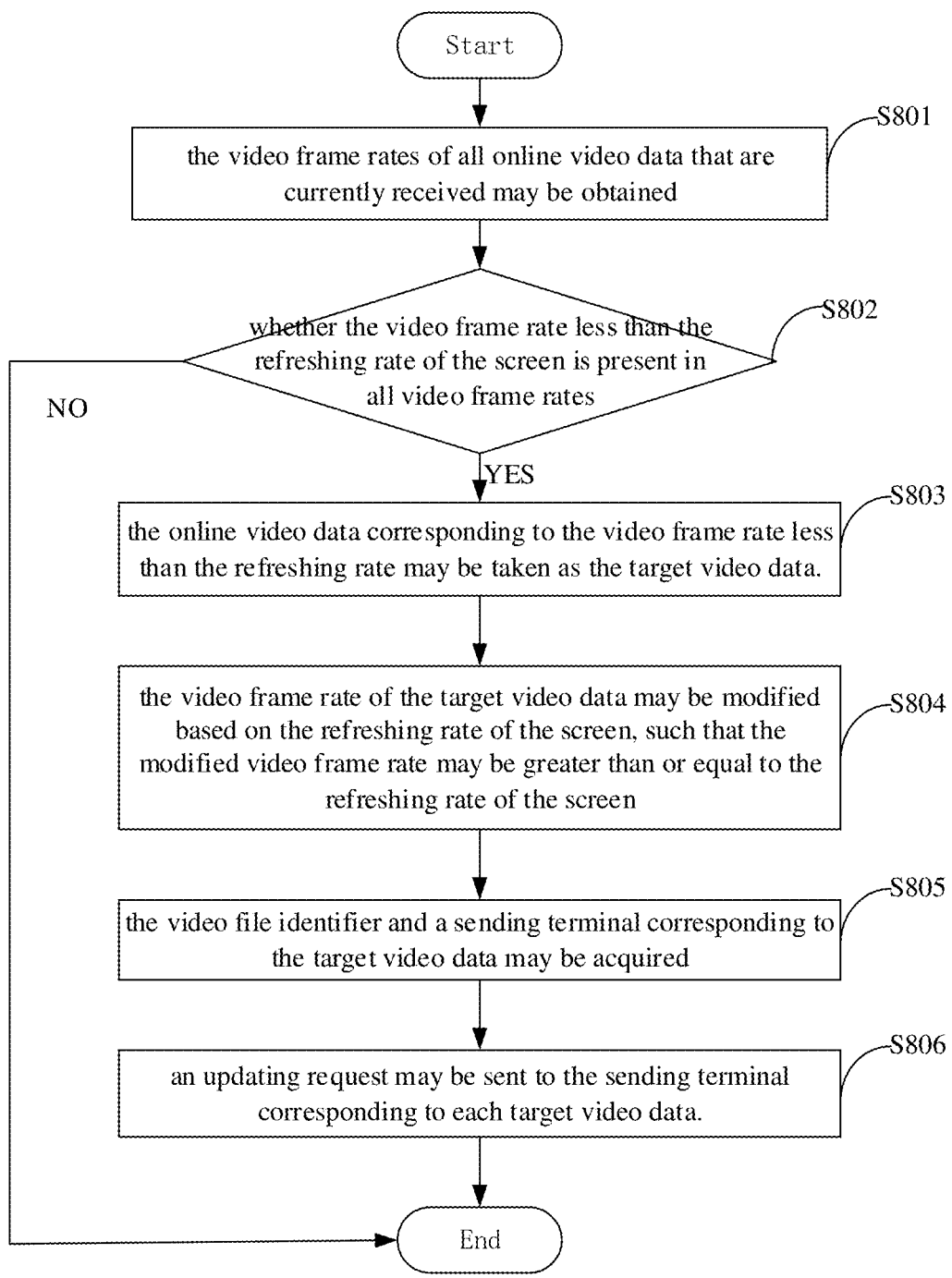
FIG. 8 is a flow chart of a video-processing method according to still another embodiment of the present disclosure.

In addition, after obtaining the target video data, the video frame rate corresponding to the target video data may be increased, such that, after the modification, the video frame rates of all online video data may be greater than or equal to the refreshing rate of the screen. Specifically, as shown in FIG. 8, a video-processing method according to an embodiment of the present application is provided. The method may be applied in an electronic device. The electronic device may include a processor and a screen. In the present embodiment, the processor may be the subject for executing the method. Specifically, the method may include operations S801 to S806.

In an operation S801, the video frame rates of all online video data that are currently received may be obtained.

In an operation S802, it may be determined whether the video frame rate less than the refreshing rate of the screen is present in all video frame rates.

In an operation S803, the online video data corresponding to the video frame rate less than the refreshing rate may be taken as the target video data.

In an operation S804, the video frame rate of the target video data may be modified based on the refreshing rate of the screen, such that the modified video frame rate may be greater than or equal to the refreshing rate of the screen.

The video frame rate of the target video data may be increased, such that the video frame rate of the target video data may be greater than or equal to the refreshing rate of the screen. Specifically, the manner of increasing the video frame rate may be referred to the above-mentioned embodiments.

As an implementation, the video frame rates of all online video data that are currently received may be kept consistent. Modifying the video frame rate of the target video data based on the refreshing rate may be updating the video frame rate of each received online video data to be the refreshing frame rate of the screen. The video frame rates of all the currently received online video data may be modified to be the refreshing rate of the screen. In this way, when a plurality of online video data are played, lagging in some of the video data having low video frame rates may be avoided, and online video data having an excessively high video frame rate may be prevented from consuming too much system resource.

In an operation S805, the video file identifier and a sending terminal corresponding to the target video data may be acquired.

In addition, each online video data may correspond to one video file identifier. For example, the video file may be the online video file. The video file identifier of the online video file may be a name of the terminal that sends the video data corresponding to the online video file, or may be a login user name. For example, the electronic device may be video-connected to a first sending terminal, a second sending terminal, and a third sending terminal. Each of the electronic device, the first sending terminal, the second sending terminal, and the third sending terminal may be installed with a specified client. Each user may log in the specified client through his or her own login user name. Data of video chatting generated by each client may be named after the login user name for the client. For example, the login user name of the client of the first sending terminal may be user1, and the video file identifier of the video data sent by the first sending terminal may be user1.

In addition, the online video data currently received by the electronic device may be the video data that has been sent to the electronic device by the sending terminal and successfully received by the electronic device, and other data may further be sent to the electronic device.

When the electronic device obtains the online video data, the terminal that sent the online video data and the video file identifier of the online video data may be determined. In this way, the video file identifier and the sending terminal corresponding to the target video data may be obtained.

In an operation S806, an updating request may be sent to the sending terminal corresponding to each target video data.

The updating request may include the refreshing rate of the screen and the video file identifier corresponding to the target video data. The updating request may be configured to instruct the sending terminal, which receives the updating request, to modify remaining video data that is not sent to the electronic device and corresponds to the video file identifier, based on the refreshing rate of the screen.

The electronic device may send the updating request to the sending terminal corresponding to the target video data. To provide a concise description, the sending terminal corresponding to the target video data may be named as a target sending terminal. After the target sending terminal obtains the updating request, the target sending terminal may parse the updating request to obtain the video file identifier, and the remaining video data, which corresponds to the video file identifier and has not been sent to the electronic device, may be found. The video frame rate of the remaining video data may be modified to the refreshing rate of the screen. In this way, the video frame rate of the online video data sent to the electronic device by the target sending terminal may not be less than the refreshing rate of the screen. The electronic device may not need to perform the operation of modifying at least one of the video frame rate of the target video data and the refreshing rate of the screen to allow, after the modification, the video frame rates of all online video data to be greater than or equal to the refreshing rate.

Figure 9:
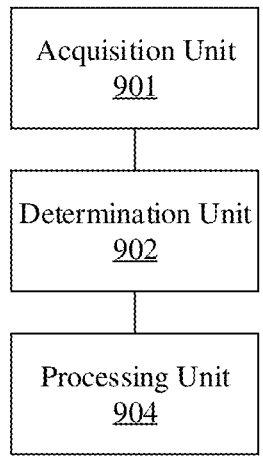
FIG. 9 is a module diagram of a video-processing apparatus according to an embodiment of the present disclosure.

As shown in FIG. 9, FIG. 9 is a structural diagram of a video-processing apparatus according to an embodiment of the present disclosure. The video-processing apparatus 900 may include an acquisition unit 901, a determination unit 902, and a processing unit 904.

The acquisition unit 901 may be configured to acquire the video frame rates of all online video data that are currently received.

The determination unit 902 may be configured to determine whether the video frame rate less than the refreshing rate of the screen is present in all video frame rates.

The processing unit 904 may be configured to modify at least one of the video frame rate of the target video data and the refreshing rate of the screen, such that after the modification, the video frame rates of all online video data may be greater than or equal to the refreshing rate of the screen.

Figure 10:
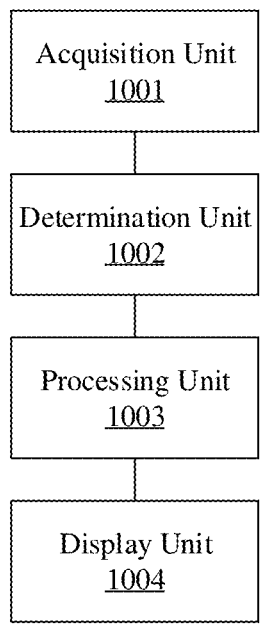
FIG. 10 is a module diagram of a video-processing apparatus according to an embodiment of the present disclosure.

As shown in FIG. 10, FIG. 10 is a structural diagram of a video-processing apparatus according to an embodiment of the present disclosure. The video-processing apparatus 1000 may include an acquisition unit 1001, a determination unit 1002 a processing unit 1003, and a display unit 1004.

The acquisition unit 1001 may be configured to acquire the video frame rates of all online video data that are currently received.

The determination unit 1002 may be configured to determine whether the video frame rate less than the refreshing rate of the screen is present in all video frame rates.

The processing unit 1003 may be configured to modify at least one of the video frame rate of the target video data and the refreshing rate of the screen, such that after the modification, the video frame rates of all online video data may be greater than or equal to the refreshing rate of the screen.

In detail, in an implementation, the processing unit 1003 may further be configured to obtain a lowest video frame rate of the target video data as a target frame rate; to modify the refreshing rate of the screen based on the target frame rate, such that the video frame rates of all online video data may be greater than or equal to the modified refreshing rate. Specifically, the refreshing rate of the screen may be modified to be the target frame rate.

In another implementation, the processing unit 1003 may further be configured to modify the video frame rate of the target video data based on the refreshing rate of the screen, such that the modified video frame rate may be greater than or equal to the refreshing rate of the screen.

The processing unit 1003 may further be configured to modify the video frame rate of the target video data based on the refreshing rate of the screen, such that the modified video frame rate may be greater than or equal to the refreshing rate of the screen, and to obtain the video file identifier and the sending terminal corresponding to the target video data. The processing unit 1003 may further be configured to send the updating request to the sending terminal corresponding to each target video data. The updating request may include the refreshing rate of the screen and the video file identifier corresponding to the target video data frame rate. The updating request may be configured to instruct the sending terminal receiving the updating request to modify the remaining video data that corresponds to the video file identifier and has not been sent to the electronic device based on the refreshing rate of the screen. Specifically, the video frame rates of all received online video data may be updated to be the refreshing rate of the screen.

The display unit 1004 may be configured to display all online video data on the screen based on the refreshing rate of the screen.

The ordinary skilled person in the art may understand that, in order to provide a concise description, detailed operations performed by the above-mentioned apparatus and modules may refer to the operations described in the method embodiments, which will not be repeatedly described hereinafter.

In the embodiments of the present disclosure, the modules may be coupled to each other electrically, mechanically, or in other forms.

In addition, each functional module in each embodiment of the present disclosure may be integrated in a single processing module. Alternatively, each functional module may be physically configured independently. Alternatively, two or more modules may be integrated in a single module. The above integrated modules may be implemented either in a form of hardware or in a form of software functional modules.

Figure 11:
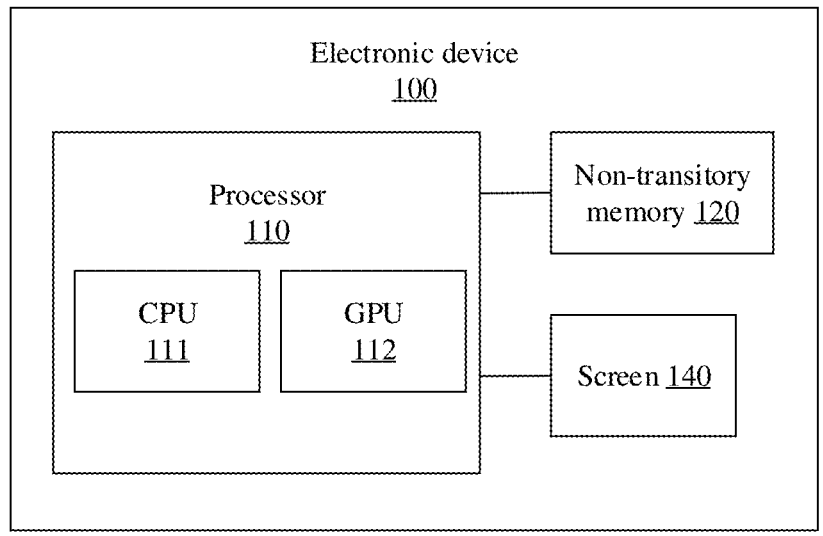
FIG. 11 is a module diagram of an electronic device according to an embodiment of the present disclosure.

As shown in FIG. 11, FIG. 11 is a structural diagram of an electronic device according to an embodiment of the present disclosure. The electronic device 100 may be an electronic device capable of running applications, such as a smart phone, a tablet computer, an e-book, and so on. The electronic device 100 in the present disclosure may include one or more of: a processor 110, a non-transitory memory 120, a screen 140, and one or more applications. The one or more applications may be stored in the non-transitory memory 120 and configured to be executed by one or more processors 110. The one or more programs may be configured to perform the method as described in the above-mentioned method embodiments.

The processor 110 may include one or more processing cores. The processor 110 may take various interfaces and lines to connect various parts of the electronic device 100. Instructions, programs, code sets, or instruction sets stored in the non-transitory memory 120 may be run or executed, and the data stored in the non-transitory memory 120 may be invoked, various functions of the electronic device 100 may be performed, and data may be processed. Alternatively, the processor 110 may be represented in at least one of hardware forms of: a digital signal processing (DSP), a field-programmable gate array (FPGA), and a programmable logic array (PLA). The processor 110 may integrate one or a combination of: a central processing unit (CPU), a graphic processing unit (GPU), and a modem. The CPU may substantially be configured to process the operating system, the user interface, applications, and so on. The GPU may be configured for rendering and drawing the displayed content. The modem may be configured for wireless communications. It should be understood that the above modem may not be integrated into the processor 110, but may be achieved through a separate communication chip.

In detail, the processor 110 may integrate one or a combination of: a central processing unit 111 (CPU), a graphic processing unit 112 (GPU), and a modem. The CPU may substantially be configured to process the operating system, the user interface, applications, and so on. The GPU may be configured for rendering and drawing the displayed content. The modem may be configured for wireless communications. It should be understood that the above modem may not be integrated into the processor 110, but may be achieved through a separate communication chip.

The non-transitory memory 120 may include a random access memory (RAM) or may include a read-only memory (RAM). The non-transitory memory 120 may be configured to store instructions, programs, code, code sets, or instruction sets. The non-transitory memory 120 may include a program storage area and a data storage area. The program storage area may store instructions for implementing the operating system, instructions for implementing at least one function (e.g., a touch function, a voice playing function, an image playing function, and so on), instructions for implementing each of the method embodiments, and so on. The data storage area may further store data created by the electronic device 100 while being used (e.g., a contact list, audio and video data, chat records), and so on.

The screen 140 may be configured to display information entered by the user, information provided for the user, and various graphical user interfaces of the electronic device. The various graphical user interfaces may include any one or a combination of graphics, texts, icons, numbers, and videos. In an embodiment, a touch screen may be disposed on a display panel so as to form an overall structure with the display panel.

Figure 12:
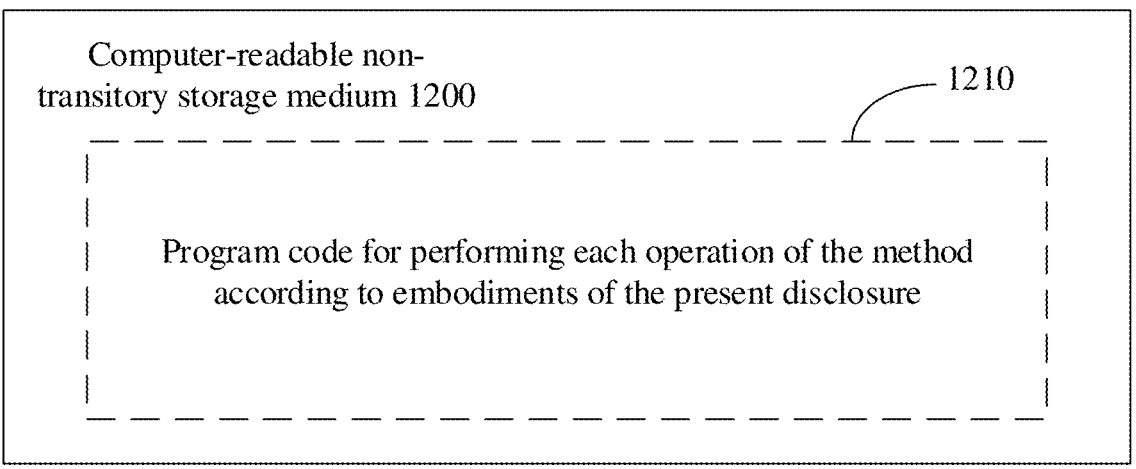
FIG. 12 is a storage unit, which stores or carries a program code for performing the video-processing method according to an embodiment of the present disclosure.

As shown in FIG. 12, FIG. 12 is a structural diagram of a computer-readable non-transitory storage medium 1200 according to an embodiment of the present disclosure. The computer-readable non-transitory storage medium 1200 may store a program code, and the program code may be invoked by the processor to execute the method described in the above-mentioned method embodiments.

The computer-readable non-transitory storage medium 1200 may be an electronic memory such as a flash memory, an electrically erasable programmable read-only memory (EEPROM), an EPROM, a hard disk, or a ROM. Alternatively, the computer-readable non-transitory storage medium 1200 may include a non-transitory computer-readable non-transitory storage medium. The computer-readable non-transitory storage medium 1200 may have a storage space for a program code 1210 that performs any operation of the methods in the method embodiments. The program code may be read from or written to one or more computer program products. The program code 1210 may be compressed, for example, in an appropriate form.

It should be noted that, the above embodiments are described to illustrate, but not limit, the technical solution of the present disclosure. Although the present disclosure are illustrated by referring to the above-mentioned embodiments, the ordinary skilled person in the art should understand that, the technical solution recorded in the above-mentioned embodiments may be modified, and some of the technical features may be replaced with equivalent features. The modifications or replacements do not drive the essence of the technical solution to depart away from the spirit and the scope of the technical solutions of the embodiments of the present disclosure.

What is claimed is:

1. A method of video-processing for an electronic device, the electronic device comprising a screen, and the method comprising:

acquiring a video frame rate of video data, wherein a number of video data is more than one, and the video frame rate comprises more than one video frame rates; and modifying at least one of the video frame rate of the video data and a refreshing rate of the screen in response to the video frame rate being less than the refreshing rate of the screen, wherein, after the modifying, the video frame rate of the video is greater than the refreshing rate, comprising:

placing the more than one video frame rates in an order from a lowest video frame rate to a highest video frame rate;

obtaining a video frame rate sequence;

comparing each of the more than one video frame rates in the video frame rate sequence with the refreshing rate of the screen one by one from the lowest video frame rate, and determining the video frame rate less than the refreshing rate of the screen in the more than one video frame rates, comprising:

determining the lowest video frame rate in the video frame rate sequence;

comparing the lowest video frame rate with the refreshing rate of the screen; and determining the video frame rate less than the refreshing rate of the screen in the more than one video frame rates, in response to the lowest video frame rate being less than the refreshing rate of the screen;

taking video data corresponding to the video frame rate less than the refreshing rate of the screen as a first video data, in response to the video frame rate less than the refreshing rate of the screen being in the more than one video frame rates;

taking a lowest video frame rate of the first video data as a target frame rate; and
modifying the refreshing rate of the screen based on the target frame rate, the video frame rate of the first video data being greater than or equal to the modified refreshing rate of the screen.

2. The method according to claim 1, wherein the modifying the refreshing rate of the screen based on the target frame rate, comprises:
modifying the refreshing rate of the screen to be the target frame rate.

3. The method according to claim 2, further comprising:
after the modifying the refreshing rate of the screen to be the target frame rate,
in the more than one video frame rates, modifying any video frame rate greater than the target frame rate to be the target frame rate.

4. The method according to claim 3, wherein the modifying any video frame rates greater than the target frame rate to be the target frame rate, comprises:
taking video data corresponding to the video frame rate greater than the target frame rate as a second video data; and
performing a re-sampling process on the second video data, and reducing a video frame rate of the second video data to be the target frame rate.

5. The method according to claim 1, wherein the modifying the refreshing rate of the screen based on the target frame rate, comprises:
modifying the refreshing rate of the screen to be less than the target frame rate.

6. The method according to claim 1, wherein before the taking video data corresponding to the video frame rate less than the refreshing rate of the screen as a first video data, in response to the video frame rate less than the refreshing rate of the screen being in the more than one video frame rates, the method further comprises:
comparing each of the more than one video frame rates with the refreshing rate of the screen, and determining the video frame rate less than the refreshing rate of the screen in the more than one video frame rates.

7. The method according to claim 1, wherein the modifying at least one of the video frame rate of the video data and the refreshing rate of the screen in response to the video frame rate being less than a refreshing rate of the screen, the video frame rate of the video being greater than or equal to the refreshing rate, comprises:
modifying the video frame rate based on the refreshing rate of the screen.

8. The method according to claim 7, wherein the modifying the video frame rate based on the refreshing rate of the screen, comprises:
increasing the video frame rate by inserting a new video frame based on the refreshing rate of the screen.

9. The method according to claim 7, wherein the video data is online video data, and the method further comprises:
after the modifying the video frame rate based on the refreshing rate of the screen, obtaining a video file identifier and a sending terminal corresponding to the video data; and
sending an updating request to the sending terminal, wherein the updating request comprises the refreshing rate of the screen and the video file identifier corresponding to the video data; and
the updating request is configured to instruct the sending terminal, which receives the updating request, to modify remaining video data that corresponds to the video file identifier and has not been sent to the electronic device based on the refreshing rate of the screen.

10. The method according to claim 9, wherein the video file identifier is a name or a login user name of the terminal corresponding to the video data.

11. The method according to claim 9, wherein the number of video data is more than one, and the modifying the video frame rate based on the refreshing rate of the screen, comprises:
updating the video frame rates of the more than one online video data to be the refreshing rate of the screen.

12. An electronic device, comprising:
a screen;
at least one processor; and
at least one non-transitory memory comprising program code;
the at least one non-transitory memory and the program code being configured to, with the at least one processor, cause the electronic device to perform:
acquiring a video frame rate of video data, wherein a number of video data is more than one, and the video frame rate comprises more than one video frame rates; and
modifying at least one of the video frame rate of the video data and a refreshing rate of the screen in response to the video frame rate being less than the refreshing rate of the screen, wherein, after the modifying, the video frame rate of the video is greater than the refreshing rate, comprising:
placing the more than one video frame rates in an order from a lowest video frame rate to a highest video frame rate;
obtaining a video frame rate sequence;
comparing each of the more than one video frame rates in the video frame rate sequence with the refreshing rate of the screen one by one from the lowest video frame rate, and determining the video frame rate less than the refreshing rate of the screen in the more than one video frame rates, comprising:
determining the lowest video frame rate in the video frame rate sequence;
comparing the lowest video frame rate with the refreshing rate of the screen; and
determining the video frame rate less than the refreshing rate of the screen in the more than one video frame rates, in response to the lowest video frame rate being less than the refreshing rate of the screen;
taking video data corresponding to the video frame rate less than the refreshing rate of the screen as a first video data, in response to the video frame rate less than the refreshing rate of the screen being in the more than one video frame rates;
taking a lowest video frame rate of the first video data as a target frame rate; and
modifying the refreshing rate of the screen based on the target frame rate, the video frame rate of the first video data being greater than or equal to the modified refreshing rate of the screen.

13. The electronic device according to claim 12, wherein while modifying the refreshing rate of the screen based on the target frame rate, the program code is further configured to execute the operations of:
modifying the refreshing rate of the screen to be the target frame rate.

14. The electronic device according to claim 13, wherein the program code is further configured to execute the operations of:
  after the modifying the refreshing rate of the screen to be the target frame rate, in the more than one video frame rates, modifying any video frame rate greater than the target frame rate to be the target frame rate.

15. The electronic device according to claim 14, wherein while modifying any video frame rates greater than the target frame rate to be the target frame rate, the program code is further configured to execute the operations of:
  taking video data corresponding to the video frame rate greater than the target frame rate as a second video data; and
  performing a re-sampling process on the second video data, and reducing a video frame rate of the second video data to be the target frame rate.

16. A non-transitory computer-readable medium, having a computer code stored therein, wherein the computer code is capable of being invoked by a processor to execute operations of:
  acquiring a video frame rate of video data, wherein a number of video data is more than one, and the video frame rate comprises more than one video frame rates; and
  modifying at least one of the video frame rate of the video data and a refreshing rate of a screen in response to the video frame rate being less than the refreshing rate of the screen, wherein, after the modifying, the video frame rate of the video is greater than the refreshing rate, comprising:
    placing the more than one video frame rates in an order from a lowest video frame rate to a highest video frame rate;
    obtaining a video frame rate sequence;
    comparing each of the more than one video frame rates in the video frame rate sequence with the refreshing rate of the screen one by one from the lowest video frame rate, and determining the video frame rate less than the refreshing rate of the screen in the more than one video frame rates, comprising:
      determining the lowest video frame rate in the video frame rate sequence;
      comparing the lowest video frame rate with the refreshing rate of the screen; and
      determining the video frame rate less than the refreshing rate of the screen in the more than one video frame rates, in response to the lowest video frame rate being less than the refreshing rate of the screen;
    taking video data corresponding to the video frame rate less than the refreshing rate of the screen as a first video data, in response to the video frame rate less than the refreshing rate of the screen being in the more than one video frame rates;
    taking a lowest video frame rate of the first video data as a target frame rate; and
    modifying the refreshing rate of the screen based on the target frame rate, the video frame rate of the first video data being greater than or equal to the modified refreshing rate of the screen.

* * * * *